Patented Nov. 28, 1944

2,363,703

UNITED STATES PATENT OFFICE 2,363,703

COPOLYMER COMPOSITIONS

William J. Sparks, Peoria, Ill., and Robert M. Thomas, Union, N. J., assignors, by mesne assignments, to Jasco, Incorporated, a corporation of Louisiana No Drawing. Application May 11, 1940, Serial No. 334,585

8 Claims. (Cl. 260—23)

This application relates to synthetic, plastic, elastic, flexible, rubbery compounds; relates particularly to cured compounds of olefinic polymers with pigments, and relates especially to isobutylene-diolefinic interpolymers of high molecular weight in combination with sulfur as a curing agent and with pigments, especially carbon black for increasing the abrasion resistance without loss of the flexure resistance.

It has been found possible by a low temperature technique to produce high molecular weight polymers containing mixed isoolefinic and diolefinic substances such as isobutylene and butadiene, which polymers, or copolymers, or interpolymers, are readily produced with molecular weights ranging from 15,000 or 20,000 to 150,000 or above, and iodine numbers ranging from 1 or 2 to 30 or 40. These polymers differ from polymers of isobutylene alone in that they show the very valuable property of curing with sulfur to yield products of high tensile strength ranging from 2,000 to 4,500 pounds per square inch, and high elasticity and elongation ranging from 900% to 1,200% or more. These polymers are desirably compounded with zinc oxide and stearic acid, as well as with the sulfur required for the curing, and with a sulfurization aid such as Tuads (tetra methyl thiuram disulfide) or other organic sulfide compound capable of acting as a sulfurization aid, and when so prepared they are valuable materials for many structural uses. It is found however that as so prepared they do not have as high a resistance to abrasion as is desirable, since in this condition the abrasion resistance is little better than that of rubber.

These polymers are substitutes for rubber, but they are not synthetic rubber, in view of the outstanding chemical differences between the polymers and rubber, especially the amount of chemical unsaturation as measured by the iodine number, which in rubber ranges from about 350 to 370 while in the case of these polymers it ranges from 1 or 2 to 40 or 50 as extreme limits and preferably ranges from 2 to 10. The outstanding chemical difference between the polymers and rubber is further shown by the difference in the manner of reacting with sulfur, in view of the very great difference in unsaturation, and by the further fact that a limited number of specific substances (which are sulfurization aids of the type of organic sulfides, such as the Tuads above mentioned) are important in catalyzing the sulfurization reaction in the polymers while preventing breakdown in molecular weight.

A further outstanding difference between rubber and the polymers is the subject matter of the present invention, and is found in the admixtures of the polymers and carbon black. Carbon black is a standard filler for rubber, and serves to improve its abrasion resistance, but the addition of carbon black greatly reduces the flexure resistance of the rubber.

The present invention provides a new composition of matter consisting broadly of the interpolymer of an isoolefin with a diolefin together with a relatively large proportion of carbon black. It is found that relatively very large quantities of carbon black can be added to the interpolymer substance to produce a very great increase in the resistance of the polymer to abrasion, wear, cutting, shock, and light, without decreasing the resistance to repeated flexure. Thus in the case of rubber compounds, the addition of carbon black, while it increases the abrasion resistance of the rubber by a substantial and valuable amount, simultaneously reduces very greatly the flexure resistance of the compound, and accordingly for any specific use of rubber, there is an optimum value at which the best compromise between abrasion resistance and flexure resistance occurs.

In sharp and conspicuous contrast, the interpolymers do not show such characteristics, but any desired amount of carbon black may be added to the compound without reduction of the flexure resistance, while increasing the abrasion resistance, wear and durability by a very great amount. Hence in the case of the interpolymers, the limit of the amount of carbon black which can be added is not set by the loss of flexure resistance, but is set by the ultimate increase in stiffness and reduction in elongation which occur when extremely large amounts, usually more than 200 parts of carbon black per 100 parts of polymer have been added. Accordingly, a polymer compound can be produced having a combination of flexure resistance and abrasion resistance far superior to any such combination of properties obtainable in compounding rubber; values of these properties are obtainable which are different not in degree, but in order of magnitude by virtue of this new and unexpected property of the inter-polymer. Furthermore, the addition of the carbon black greatly increases the resistance of the polymer to breakdown from the effects of light, particularly ultraviolet light, and this resistance also is increased by a difference, over both rubber and the uncompounded polymer, in an amount which is greater in order of magnitude rather than merely in degree.

By the invention there are thus obtained new compositions of matter produced by curing with sulfur synthetic copolymers of isoolefins with diolefins in which there is incorporated substantial amounts of carbon black.

Thus an object of the invention is to compound an isoolefin-diolefin polymer with relatively large quantities of carbon black, and to compound with the copolymer and carbon black mixture appropriate quantities of sulfur, sulfurization aid, zinc oxide, stearic acid or other fatty acids and other pigments and substances which improve the physical characteristics of the polymeric material, followed by a heat treatment to cause curing. Other objects and details of the invention will be apparent from the following description.

In practicing the invention the polymeric material is produced by first cooling a mixture of an isoolefin such as isobutylene with a diolefin such as butadiene, isoprene, pentadiene or dimethyl butadiene to temperatures ranging from about −10° C. or −40° C. to −100° C. or −150° C. by the addition to the mixed olefins of a refrigerant such as solid carbon dioxide or a diluent refrigerant such as liquid ethylene, liquid propane, liquid ethane, liquid methane, etc. To this mixture there is then added a Friedel-Crafts type catalyst such as aluminum chloride dissolved in an alkyl halide such as methyl or ethyl chloride, and preferably by spraying the cooled catalyst on to the surface of the rapidly stirred olefinic mixture. The resulting polymerization reaction yields the desired interpolymer, the exact properties of which are determined by the temperature and by the relative proportions of isoolefinic and diolefinic materials present, and the character of the particular isoolefinic and diolefinic materials used in the mixture. The solid polymer is then removed from the reaction mixture and brought up to room temperature, or the reaction may be quenched to destroy the catalyst by the addition of an oxygen containing liquid such as an alcohol, ketone, aldehyde, or an alkali such as ammonia. The polymer as so prepared preferably is made up of approximately 99% isobutylene molecules and 1% diolefin molecules; preferably has a molecular weight of 40,000 to 80,000 and an iodine number of approximately 5. The polymer as so obtained is a white plastic solid with many of the physical properties of crude rubber, although chemically it is a wholly different substance. The polymer is desirably purified from interfering substances, which probably are low molecular weight polymers, by a very drastic milling treatment in a Banbury mill at a relatively high temperature. The polymer, after treatment in the Banbury mill, is mixed with the desired fillers, either by continued treatment in the Banbury mill in the presence of the desired fillers, or the polymer may be removed from the Banbury mill and the fillers added on the open, double-roll mill.

The essential constituent of the present invention is the carbon black, which is desirably added in the ratio of 75 to 125 parts per 100 parts of copolymer but may be added in a ratio as high as 200 parts of carbon black per 100 parts of copolymer or even higher. In the same mixture it is desirable that zinc oxide be added in the proportion of ½ part to 10 parts per 100 parts of copolymer, or under certain conditions even more zinc oxide, may be added depending to some extent upon the amount of carbon black added, and depending also upon the use to which the finished compound is to be put. In addition it is desirable that stearic acid or another fatty acid in the proportion of from ½ part to 8 or 10 parts per 100 parts of polymer be added. Sulfur is an essential element of the compound, and is desirably added in the proportion of from 1 part to 5 or 6 parts. Normally about 3 parts of sulfur is all that is necessary for the curing operation, but in some instances it is desirable to have an excess of sulfur present, either as a more or less inert filler, or as an active constituent for combination with other substances which may be added to the compound. A sulfurization aid such as "Tuads" (tetra methyl thiuram disulfide) or other sulfurization aid, usually an organic sulfide, is also added in proportions ranging from ¼ part to 3 parts per 100 parts of polymer, depending to some extent upon the amount of sulfur present, since the "Tuads" serves not only as a curing aid, but functions itself, directly as a compounding agent and is to some extent equivalent to and a substitute for elementary sulfur. Many other substances may also be added for still further improving the characteristics of the material. For instance, various softening agents may be added. Various oils such as petroleum oils may be added; and many other inert fillers may also be added for various purposes, including such substances as clay, whiting, barytes, lithopone, chrome yellow, chrome green, ferric oxide, asbestos fiber, wood flour, lint and various other forms of cellulose etc. In addition varying amounts of natural rubber, butadiene polymers and copolymers prepared by polymerization in emulsion, and the asphaltic substances such as bentonite, mineral rubber etc. may also be added in varying proportions according to the desired characteristics of the cured compound.

*Example 1*

A desirable formula according to the present invention may contain:

| | Parts |
|---|---|
| Isobutylene-butadiene copolymer | 100 |
| Carbon black | 75 |
| Zinc oxide | 5 |
| Stearic acid | 3 |
| Sulfur | 3 |
| Tuads | 1 |

In preparing this compound, the copolymer is preferably placed upon the open roll mill and milled for an interval of about 5 to 8 minutes, this time being sufficient to warm the material and plasticize it but insufficient to effect any substantial molecular weight breakdown. The various other substances above-mentioned are then added on the mill, the polymer being cut back on the rolls in the usual manner for mixing in the solids. The mixing is desirably continued for a time interval of from 5 to 20 minutes, depending upon the original molecular weight of the polymer, the amount of filler to be added, etc. The sulfur is desirably added near the beginning of the mixing operation, and the sulfurization aid is preferably reserved until the very close of the mixing, and in some instances it is desirable to cool the mill before the sulfurization aid is added or to transfer the compound to another, cooler, mill for milling in the sulfurization aid, this being desirable in order to avoid premature curing of the mix. The mix is then removed from the mill, and is ready for molding and curing. The mix may be molded in any desired manner and is preferably cured at a temperature of approximately 155° C. (65 pounds steam pressure) for a period of from 15 to 120 minutes.

When so treated, the cured compound is found to have a tensile strength of approximately 2,800 pounds, an elongation of approximately 1,000%, and flexure resistance and abrasion resistance as shown in the following table in comparison to rubber:

|  | Copolymer compound | Natural rubber |
|---|---|---|
| Per cent gas black | 75 | 50 |
| Flexures to initial cracking [1] | 1,500,000 | 140,000 |
| Flexures to complete cracking | 5,000,000 | 850,000 |
| Abrasion loss (cc./H. P. hr.)[2] | 111 | 210 |

[1] A De Mattia flexing machine was used.
[2] A du Pont abrader was used. The lower the loss the more abrasion resistant the composition.

This shows clearly the very great gain in abrasion resistance and flexure resistance obtainable by addition to the polymer of relatively large amounts of carbon black.

Example 2

A similar compound containing the same constituents as in Example 1, but containing 100 parts of carbon black was prepared as follows:

| | Parts |
|---|---|
| Isobutylene-butadiene copolymer | 100 |
| Carbon black | 100 |
| Zinc oxide | 5 |
| Stearic acid | 3 |
| Sulfur | 3 |
| Tuads | 1 |

This compound was prepared in the same manner as described in connection with Example 1 and was molded and cured in the same manner. The cured polymer had a somewhat lower tensile strength, slightly lower elongation approximately 900%, and slightly higher resistance to abrasion.

|  | Copolymer compound | Natural rubber |
|---|---|---|
| Per cent gas black | 100 | 100 |
| Flexures to initial cracking [1] | 985,000 | 10,000 |
| Flexures to complete cracking | 1,800,000 | 140,000 |
| Abrasion loss (cc./H. P. hr.)[2] | 98 | 225 |

[1] A De Mattia flexing machine was used.
[2] A du Pont abrader was used. The lower the loss the more abrasion resistant the composition.

The quantity of carbon black may be made still higher if desired but at 200 parts of carbon black per 100 parts of copolymer the cured compound is stiffer than is usually desirable, and of lower elongation and in addition cures slowly and may tend to blister.

Thus the invention comprises a synthetic polymer of isoolefinic and diolefinic substances compounded with large proportions of carbon black and cured with sulfur to yield a material having a high tensile strength, high elongation, and outstandingly high resistance to abrasion and flexure.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A composition of matter consisting of a rubbery material composed wholly of a low temperature synthetic polymer of a major proportion of isoolefin with a minor proportion of a diolefin prepared at temperatures within the range of —10° C. to —150° C., characterized by a molecular weight within the range of 15,000 to 150,000; an iodine number within the range between 1 to 30; solidity, plasticity, and reactivity with sulfur to develop a tensile strength and an elastic limit, together with a filler material comprising carbon black in the ratio of 75 parts to 200 parts per 100 parts of polymer.

2. A composition of matter consisting of a rubbery material composed wholly of a low temperature synthetic polymer of a major proportion of isoolefin with a minor proportion of a diolefin prepared at temperatures within the range of —10° C. to —150° C., characterized by a molecular weight within the range of 15,000 to 150,000; an iodine number within the range between 1 to 30; solidity, plasticity, and reactivity with sulfur to develop a tensile strength and an elastic limit, together with a filler comprising carbon black in the ratio of 75 parts to 200 parts per 100 parts of polymer and sulfur.

3. A composition of matter consisting of a rubbery material composed wholly of a low temperature synthetic polymer of a major proportion of isoolefin with a minor proportion of a diolefin prepared at temperatures within the range of —10° C. to —150° C., characterized by a molecular weight within the range of 15,000 to 150,000; an iodine number within the range between 1 to 30; solidity, plasticity, and reactivity with sulfur to develop a tensile strength and an elastic limit, together with a filler comprising carbon black in the ratio of 75 parts to 200 parts per 100 parts of polymer and sulfur within the ratio of 1 to 5 parts.

4. A composition of matter consisting of a rubbery material composed wholly of a low temperature synthetic polymer of a major proportion of isoolefin with a minor proportion of a diolefin prepared at temperatures within the range of —10° C. to —150° C., characterized by a molecular weight within the range of 15,000 to 150,000; an iodine number within the range between 1 to 30; solidity, plasticity, and reactivity with sulfur to develop a tensile strength and an elastic limit, together with a filler comprising carbon black in the ratio of 75 parts to 200 parts per 100 parts of polymer, sulfur and a sulfurization aid.

5. A composition of matter consisting of a rubbery material composed wholly of a low temperature interpolymer of a major proportion of isobutylene with a minor proportion of a conjugated diolefin produced at a temperature within the range of —10° C. to —150° C., characterized by a molecular weight ranging between 15,000 and 150,000, an iodine number within the range between 1 and 40, solidity, plasticity, reactivity with sulfur to yield an elastic limit, together with a filler comprising carbon black in the proportion of 75 to 200 parts per 100 parts of polymer, sulfur, a sulfurization aid, zinc oxide and stearic acid.

6. A composition of matter consisting of a rubbery material composed wholly of a low temperature interpolymer of a major proportion of isobutylene with a minor proportion of a conjugated diolefin comprising butadiene produced at a temperature within the range of —10° C. to —150° C., characterized by a molecular weight ranging between 15,000 and 150,000, an iodine number within the range between 1 and 40, solidity, plasticity, reactivity with a filler comprising sulfur to yield an elastic limit, together with carbon black in the proportion of 75 to 200 parts per 100 parts of polymer, sulfur, sulfurization aid, zinc oxide and stearic acid.

7. In the method of processing a rubbery material consisting wholly of a synthetic interpolymer of a major proportion of isoolefin with a minor proportion of a diolefin produced by chilling a mixture of an isoolefin with a diolefin to a temperature within the range of —40° to —150° C. by the application thereto of a solution of Friedel-Crafts catalyst in a low freezing non-complex forming solvent characterized by less than 3 carbon atoms per molecule and an inorganic substituent which is non-reactive with the catalyst, the steps comprising adding to the polymer a filler material comprising carbon black in the proportion of 75 parts to 200 parts per 100 parts of polymer.

8. In the method of processing a rubbery material consisting wholly of a synthetic interpolymer of a major proportion of isoolefin with a minor proportion of a diolefin produced by chilling a mixture of an isoolefin with a diolefin to a temperature within the range of —40° to —150° C. by the application thereto of a solution of Friedel-Crafts catalyst in a low freezing non-complex forming solvent characterized by less than 3 carbon atoms per molecule and an inorganic substituent which is non-reactive with the catalyst, the steps comprising adding to the polymer a filler material comprising carbon black in the proportion of 75 parts to 200 parts per 100 parts of polymer, sulfur and a sulfurization aid.

WILLIAM J. SPARKS.
ROBERT M. THOMAS.